United States Patent
Eidelman (10) Patent No.: US 9,262,276 B2
(45) Date of Patent: Feb. 16, 2016

(54) STORAGE DEVICE AS BUFFER FOR UNRELIABLE STORAGE

(71) Applicant: NICE-SYSTEMS LTD., Ra'anana (IL)

(72) Inventor: Dan Eidelman, Holon (IL)

(73) Assignee: Qognify Ltd., Ra'anana (IL)

( * ) Notice: Subject to any disclaimer, the term of this patent is extended or adjusted under 35 U.S.C. 154(b) by 98 days.

(21) Appl. No.: 14/176,346

(22) Filed: Feb. 10, 2014

(65) Prior Publication Data

US 2015/0227437 A1    Aug. 13, 2015

(51) Int. Cl.
*G06F 11/14*    (2006.01)
*G06F 11/20*    (2006.01)
*G06F 11/30*    (2006.01)

(52) U.S. Cl.
CPC .......... *G06F 11/1456* (2013.01); *G06F 11/201* (2013.01); *G06F 11/2069* (2013.01); *G06F 11/3034* (2013.01); *G06F 2201/84* (2013.01)

(58) Field of Classification Search
CPC .............. G06F 11/0793; G06F 2213/0026; H04L 41/0654; H04L 41/0659; H04L 41/0663; H04L 45/28; H04L 49/25
See application file for complete search history.

(56) References Cited

U.S. PATENT DOCUMENTS

| | | | | |
|---|---|---|---|---|
| 6,467,048 B1 * | 10/2002 | Olarig et al. | | 714/6.32 |
| 6,505,305 B1 * | 1/2003 | Olarig | | 714/5.11 |
| 8,762,793 B2 * | 6/2014 | Grube et al. | | 714/47.1 |
| 2003/0126315 A1 * | 7/2003 | Tan et al. | | 710/1 |
| 2006/0041782 A1 * | 2/2006 | Ali et al. | | 714/6 |
| 2008/0244306 A1 * | 10/2008 | Kumagai | | 714/3 |
| 2012/0216069 A1 * | 8/2012 | Bensinger | | 714/3 |
| 2013/0254624 A1 * | 9/2013 | Dhuse et al. | | 714/763 |

* cited by examiner

*Primary Examiner* — Nadeem Iqbal
(74) *Attorney, Agent, or Firm* — Pearl Cohen Zedek Latzer Baratz LLP (57) ABSTRACT

A system and method for managing storage of a digital stream including writing data of the stream to a network storage device, while monitoring availability of the network storage device, switching to writing additional data of the stream to a standby storage device while continuing monitoring the availability of the network storage device, if the network storage device becomes unavailable, switching back to writing additional data of the stream to the network storage device while continuing monitoring the availability of the network storage device, when the network storage device becomes available, and writing to the network storage device the additional data that was written to the standby storage device while the network storage device was unavailable, concurrently with the writing of the additional data of the stream to the network storage device.

17 Claims, 6 Drawing Sheets

STORAGE DEVICE AS BUFFER FOR UNRELIABLE STORAGE

BACKGROUND

Some applications require video recordings from a plurality of cameras 24 hours a day, 7 days a week, 365 days a year. The continuous video recording needs to be performed in real time. This may require the use of mass storage capacity and managing capabilities to gain the most efficient, uninterrupted and reliable recording process.

For example, organizations that utilize large numbers of surveillance cameras, such as casinos, airports, large banks or secured government institutions, are required to handle thousand of hours of real time video recordings. Reliability of video recording is a critical issue for surveillance systems. Video recordings of surveillance systems may be used for the investigation of various events and in some situation may be used in the court of law as evidence. Thus, the video recording should be continuous with no substantial gaps that may disable reliable interpretation of the video. Failure to record segments of the captured video may void an end-user contract or regulation requirement of the recording system.

Contemporary mass storage devices for large and medium enterprises utilize networking technologies to connect to the users. Such storage devices may be Storage Area Network (SAN), a Network Attached Storage (NAS), a cloud storage device, or the like. The real time characteristic of the system requires uninterrupted and stable performance of these storage devices over long periods of time. Networked storage devices provide many advantages such as huge memory capacities at reduced cost, outsourcing options and flexibility. However, these storage devices may suffer from disconnections or unstable performance because of networking problems or because of congestions that may occur when many users try to access the same storage device at the same time.

SUMMARY

According to embodiments of the present invention, there is provided a method for managing storage of a digital stream, the method may include writing data of the stream to a main storage device, while monitoring availability of the main storage device; switching to writing additional data of the stream to a standby storage device while continuing monitoring the availability of the main storage device, if the main storage device becomes unavailable; switching back to writing additional data of the stream to the main storage device while continuing monitoring the availability of the main storage device, when the main storage device becomes available; and writing to the main storage device the additional data that was written to the standby storage device while the main storage device was unavailable, concurrently with the writing of the additional data of the stream to the main storage device.

According to embodiments of the present invention, the main storage device may be a network storage device and the standby storage device may be a direct access storage device.

According to embodiments of the present invention, monitoring availability of the network storage device may include performing network tests.

According to embodiments of the present invention, monitoring availability of the main storage device may include performing test read and write operations into various locations on the main storage device; measuring response time of the test operations; and determining that the main storage device may be unavailable if the response time may be above a predetermined threshold.

According to embodiments of the present invention, the method may include determining whether the main storage device may be available or unavailable based on at least one of: a type of failure of the main storage device, amount of failures of the main storage device that occurred in a time interval and on an average duration of each failure of the main storage device.

According to embodiments of the present invention, the method may include monitoring of available throughput of the main storage device, wherein the writing to the main storage device the additional data that was written to the standby storage device may be performed considering available throughput of the main storage device.

According to embodiments of the present invention, the data may be saved in files, and the method may include maintaining a list of the files, wherein the list may include for each file an indication of whether it is stored on the main storage device or on the standby storage device and location of each file on either the main storage device or the standby storage device.

According to embodiments of the present invention, the method may include maintaining a linked list, wherein the linked list may include order of files containing consecutive data of a stream, and indication for each file on whether it may be stored on the main storage device or on the standby storage device, wherein the writing to the main storage device the additional data that was written to the standby storage device may include scanning the linked list; writing files that may be stored in the standby storage device to the main storage device; and updating the linked list.

According to embodiments of the present invention, there is provided a recording server for managing storage of a digital stream, the recording server may include a processor configured to write data of the stream to a main storage device, while monitoring availability of the main storage device; switch to writing additional data of the stream to a standby storage device while continuing monitoring the availability of the main storage device, if the main storage device becomes unavailable; switch back to writing additional data of the stream to the main storage device while continuing monitoring the availability of the main storage device, when the main storage device becomes available; and write to the main storage device the additional data that was written to the standby storage device while the main storage device was unavailable, concurrently with the writing of the additional data of the stream to the main storage device.

According to embodiments of the present invention, the processor may be configured to monitor availability of the network storage device by performing network tests.

According to embodiments of the present invention, the processor may be configured to monitor availability of the network storage device by performing test read and write operations into various locations on the main storage device; measuring response time of the test operations; and determining that the main storage device may be unavailable if the response time may be above a predetermined threshold.

According to embodiments of the present invention, the processor may be configured to determine whether the main storage device may be available or unavailable based on at least one of: a type of failure of the main storage device, amount of failures of the main storage device that occurred in a time interval and on an average duration of each failure of the main storage device.

According to embodiments of the present invention, the processor may be configured to monitor available throughput of the main storage device; and write to the main storage device the additional data that was written to the standby storage device considering available throughput of the main storage device.

According to embodiments of the present invention, there is provided a non-transitory computer-readable storage medium, having stored thereon instructions, that when executed on a processor, may cause the processor to write data of the stream to a main storage device, while monitoring availability of the main storage device; switch to writing additional data of the stream to a standby storage device while continuing monitoring the availability of the main storage device, if the main storage device becomes unavailable; switch back to writing additional data of the stream to the main storage device while continuing monitoring the availability of the main storage device, when the main storage device becomes available; and write to the main storage device the additional data that was written to the standby storage device while the main storage device was unavailable, concurrently with the writing of the additional data of the stream to the main storage device.

According to embodiments of the present invention, the instructions when executed may cause the processor to monitor availability of the network storage device by performing network tests.

According to embodiments of the present invention, the instructions when executed may cause the processor to monitor availability of the network storage device by performing test read and write operations into various locations on the main storage device; measuring response time of the test operations; and determining that the main storage device may be unavailable if the response time may be above a predetermined threshold.

According to embodiments of the present invention, the instructions when executed may cause the processor to determine whether the main storage device may be available or unavailable based on at least one of: a type of failure of the main storage device, amount of failures of the main storage device that occurred in a time interval and on an average duration of each failure of the main storage device.

According to embodiments of the present invention, the instructions when executed cause the processor to monitor available throughput of the main storage device; and write to the main storage device the additional data that was written to the standby storage device considering available throughput of the main storage device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", allocating, "checking", "receiving", "selecting", "comparing", "reporting", "recording", "detecting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

As used herein, the term "storage unit" may refer to any apparatus, device, system and/or array of devices that is configured to store data, for example, video recordings. Each of the storage units may include the ability to write data to the storage and read the data from the storage unit for further use, e.g., video files may be read from the storage unit, upon a request, for example, when an investigation of an incident is required.

Some embodiments of the invention may be related to recording, in real time, of video data captured by cameras, for example, cameras of a surveillance system. As used herein, capturing, streaming, receiving, storing or performing any other action on a video stream in real time relates to performing these actions on the video stream at substantially the same rate in which the video stream is captured. Thus, receiving of incoming packets of video stream that were captured over a certain time period may last substantially no more than that time period. The video data may be encoded and decoded (i.e., compressed and decompressed) according to any known or propriety video compression standard such as H.264/MPEG-4, H.265, H.263, MPEG2, etc., using any known video codec, for example, H.264/MPEG-4 AVC, Microsoft, On2, H.265 or H.263 codecs, etc.

Embodiments of the present invention are described with relation to video recording. However, it will be apparent to these skilled in the art that embodiments of the present invention may be used for any real time recording of any type of digital media such as video, audio, text, screen captures and the like, and any combination thereof.

Figure 1:
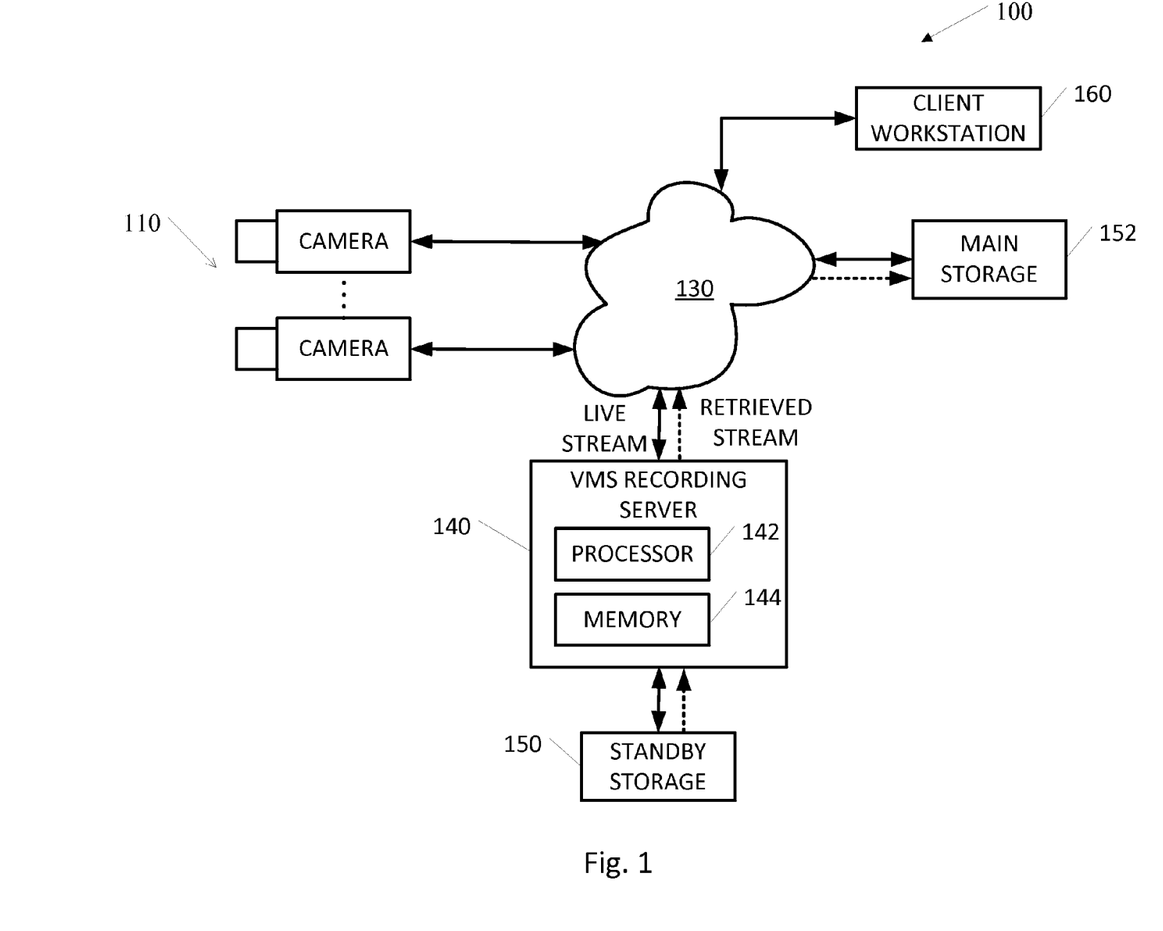
FIG. 1 is a high level block diagram of an exemplary video storage management system according to some embodiments of the present invention.

Reference is now made to FIG. 1, which is a high-level block diagram of video storage management system according to some embodiments of the present invention. A system 100 may include one or more edge video capturing devices or cameras 110, such as digital Internet protocol (IP) cameras and/or analog cameras. Analog cameras may be connected to a network 130 through network video encoder (not shown) that may receive the analog video signals from analog cameras, convert them to digital video, compress the digital video and stream it to network 130. IP cameras may stream compressed digital video directly to network 130. Cameras 110, may compress the video according to any known or propriety video compression standard such as H.264, MPEG-4, H.265, H.263, MPEG2, etc.

System 100 may include one or more video management system (VMS) recording servers 140, referred to hereinafter as recording servers 140, configured to control cameras 110, request video streams, record the video streams in storage units 152, 150 and distribute the streams to client workstations 160 either in real time as live video or as playback. Recording servers 140 may be managed by a user through client workstations 160. Recording servers 140 may support configuration of direct streaming of live video from cameras 110 to clients 160 via multicast for live monitoring.

System 100 may include a main storage unit 152 and a standby storage unit 150. Main storage unit 152 may include network storage device, e.g., storage units that are available to the recording server 140 via network 130. Main storage unit 152 may be configured, for example, as a Storage Area Network (SAN), as a Network Attached Storage (NAS), as a cloud service or the like. Standby storage unit 150 may include direct access storage device, e.g., a storage unit that is directly connected to recording server 140, also referred to as Direct-Attached Storage (DAS). Main storage device 152 may include one or more mass storage devices such as Secure Digital (SD) cards, optical storage devices such as CDs, DVDs, or laser disks, magnetic storage devices such as tapes, hard disks, Redundant Array of Independent Disks (RAID), or the like. Typically, the capacity of main storage unit 152 is much larger than the capacity of standby storage unit 150. For example, in some embodiments the capacity of main storage unit 152 may reach Tera Bytes (TB, fourth power of 1000 bytes) or Peta Bytes (PB, fifth power of 1000 bytes) of data, while the capacity of standby storage unit 150 may be up to 1-100 Tera Bytes of data.

Standby storage unit 150 may be any storage unit that is highly reliable, e.g., having nearly zero chance of failure, capable of high performance at substantially fully random input/output (IO) in rates in the range of tens of MB per second (MB/s). Standby storage unit 150 may have small to medium capacity. For example, standby storage unit 150 may include any of solid-state drive (SSD), a random access drive (RAM) drive, e.g., a portion of physical RAM (primary storage) that with the use of appropriate software is made available to the recording server 140 as a regular drive (secondary storage), a RAID 1 or RAID 10 of fast mechanical drives, e.g., 15K revolutions per minute (RPM), or the like.

Each of recording servers 140 may include a processor 142 and a memory unit 144. Processor 142 may be configured to execute commands included in a program, algorithm or code stored in memory 144. Processor 142 may include components such as, but not limited to, one or more central processing units (CPU) or any other suitable multi-purpose or specific processors or controllers, one or more input units, one or more output units or any other suitable hardware components and/or software components. Processor 142 may be any computation device that is configured to execute various operations included in some methods disclosed herein. Memory 144 may be a non-transitory computer-readable storage medium that may store thereon instructions that when executed by processor 142, cause processor 142 to perform operations and/or methods, for example, the method disclosed herein. Typically, memory 144 may be or may include volatile memory for temporary storage of data.

Cameras 110, one or more recording servers 140, client workstations 160 and main storage unit 152 may all be interconnected by network 130. Network 130 may be segmented and may include a capturing segment connecting cameras 110 and recording servers 140, a viewing segment connecting recording servers 140 and clients 160 and a storage segment connecting recording servers 140 and main storage unit 152. Network 130, or any segment of network 130, may be, may comprise, or may be part of any type of computer network that supports video streaming, such as private IP network, the internet, a public or private data network, a local area network (LAN), a wide area network (WAN), a wire line or wireless network, a local, regional, or global communication network, an enterprise intranet, any combination of the preceding and/or any other suitable communication infrastructure.

In some applications, for example, surveillance applications, some or all of cameras 110 may capture live video continuously. The live video may be streamed continuously, in real time, by cameras 110 to recording servers 140 through network 130. The live video may be stored by recording servers 140 on storage units 150, 152 as disclosed herein.

Availability and performance level of main storage unit 152 may directly affect the quality of the recorded video. Networked storage units are more prone to disconnection or unstable performance compared to direct attached storage (DAS) units, because of potential networking problems or because of congestions that may occur when many users try to access the same storage device at the same time. These problems may degrade the ability of recording servers 140 to obtain the required throughput, e.g., record the required amount of video in real time. Networked storage devices may suffer from network disconnection due to component failure, human error and planned maintenance. Additionally, networked storage devices may be shared by many users and systems other than system 100. Thus, networked storage devices may experience unstable performance due to high performance demand by other users of the networked storage devices that may limit the available throughput of the networked storage devices to recording servers 140.

According to embodiments of the present invention, standby storage device 150, may serve as a buffer device during time of failure or limited performance of main storage device 152. The availability of main storage device 152 may be constantly monitored by recording servers 140. In case a failure or limited performance of main storage device 152 is detected and main storage device 152 becomes unavailable, recording servers 140 may switch to recording or writing additional data of the video stream to standby storage device 150 while continuing monitoring the availability of main storage device 152. When main storage device 152 becomes available, recording servers 140 may switch back to writing additional data of the video stream to main storage device 152 and concurrently write or transfer to main storage device 152 the additional data that was previously written to standby storage device 150 while main storage device 152 was unavailable.

According to embodiments of the present invention, adding standby storage device 150 to system 100 may facilitate uninterrupted, stable performance for recording servers 140, thus ensuring that substantially all the video captured by cameras 110 is eventually stored on main storage device 152. Prior art recording solutions disregard the possibility of network disconnection or failure of the main storage device. When a disconnection or failure of the main storage device occurs, video is lost and cannot be recovered. According to embodiments of the present invention, standby storage device 150 may function as an intermediate medium to capture all the otherwise lost video data.

Figure 2:
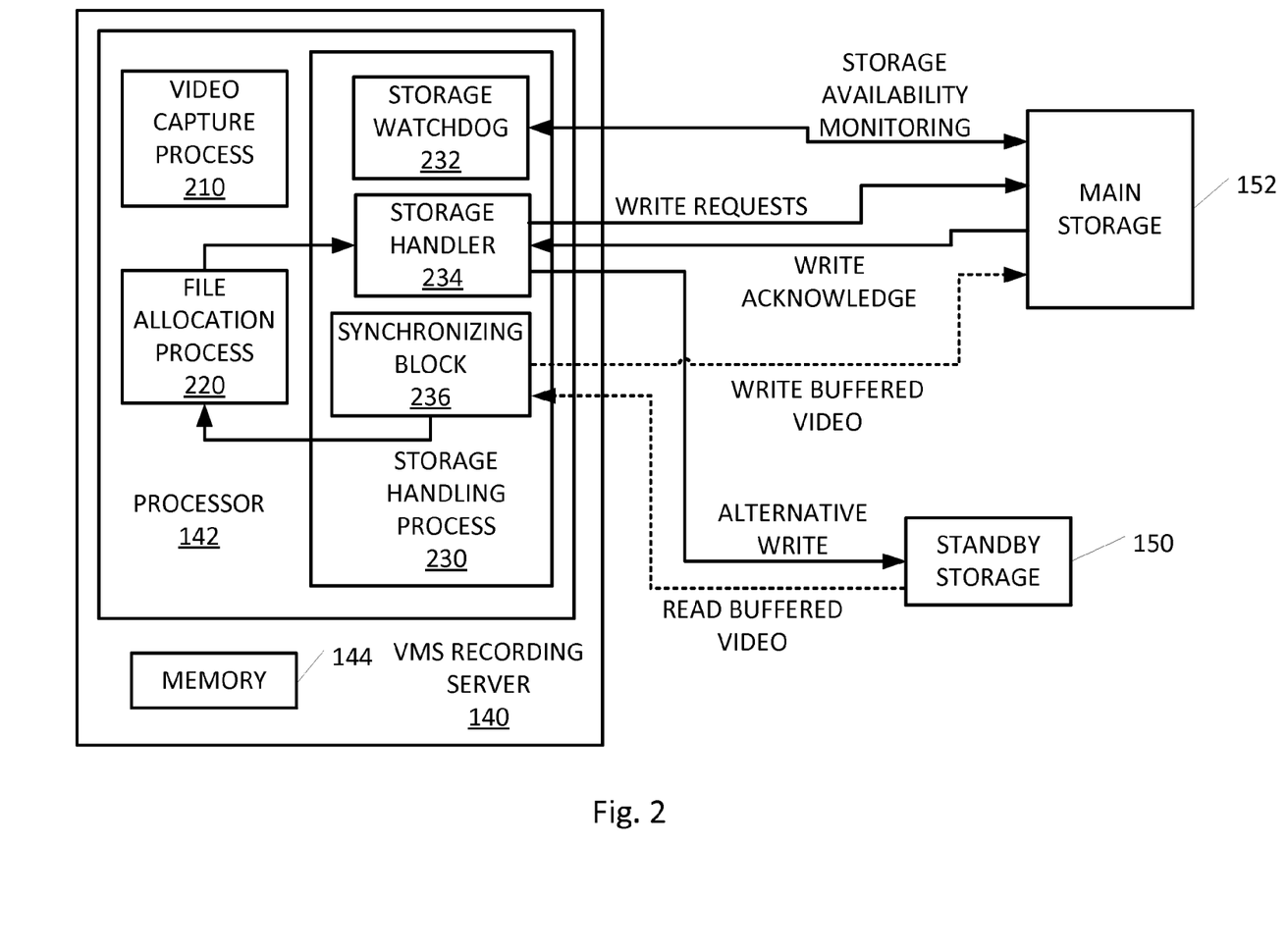
FIG. 2 is an elaborated block diagram of a recording server according to some embodiments of the present invention.

Reference is now made to FIG. 2, which is an elaborated block diagram of recording server 140 according to embodiments of the present invention. Processor 142 may be configured to execute a video capture process 210, a file allocation process 220 and storage handling process 230. Capture process 210 may obtain streams of video, for example, from cameras 110, format the video into data structures, referred to herein as files, which are suitable for storage. These files may be temporarily stored in memory 144 of recording server 140 until they are written to main storage device 152 or standby storage device 150.

File allocation process 220 may allocate free space for the files in main storage device 152 and standby storage device 150, and may maintain a database to document the channel, the time and date in which the video stream within the file has been captured and the location of the file in the storage device, being either main storage device 152 or standby storage device 150. As used herein, the term channel may refer to an identifier of the video stream or the source of the video stream. For example, a cannel may include a video stream captured by a single camera.

Storage handling process 230 may perform write and read operations of data to and from main storage device 152 or standby storage device 150 including writing or transferring of the data that was stored in standby storage device 150 to the main storage device 152. Storage handling process 230 may include a storage watchdog block 232, a storage handler block 234 and a storage synchronizing block 236. Storage watchdog block 232 may constantly monitor the availability of main storage device 152 using any applicable method or a combination of methods, as will be discussed herein. Storage handler block 234 may write data to main storage device 152 if main storage device 152 is available and to standby storage device 150 when main storage device 152 is unavailable. Data that was written to standby storage device 150 when main storage device 152 is not available may be referred to herein as buffered data. Storage handler block 234 may request main storage device 152 to provide write acknowledgment feedback indicating whether write operation has been successful for every write operation. Synchronizing block 236 may read the buffered data from standby storage device 150 and write the buffered data to main storage device 152 when main storage device 152 becomes available. Synchronizing block 236 may write the buffered data concurrently with the real time writing of the additional data of the stream to the main storage device 152 by storage handler block 234. After the buffered data is read from standby storage device 150, the buffered data may be deleted from standby storage device 150.

Memory 144 may store files of streamed data until these files are written to main storage device 152 and standby storage device 150. However, due to hardware limitations, memory 144 may have small capacity available for storing of steamed data. In case of network problems or other failure that render main storage device 152 unavailable, the capacity of memory 144, which is typically in the range of few gigabytes (GB, the third power of 1000 bytes), may not be enough to store the streamed data, which depending on bit rate in the specific design, may be in the range of 10 GB per 5 minutes. Additionally, memory 144, used for temporary storage of video is typically volatile. Thus, on a restart or power failure all data stored on memory 144 is lost. In current systems that does not include standby storage device 150, streams of data that are received while main storage device 152 is unavailable are typically lost. Losing content of video streams may be unacceptable for many applications including, for example, surveillance systems.

Figure 3:
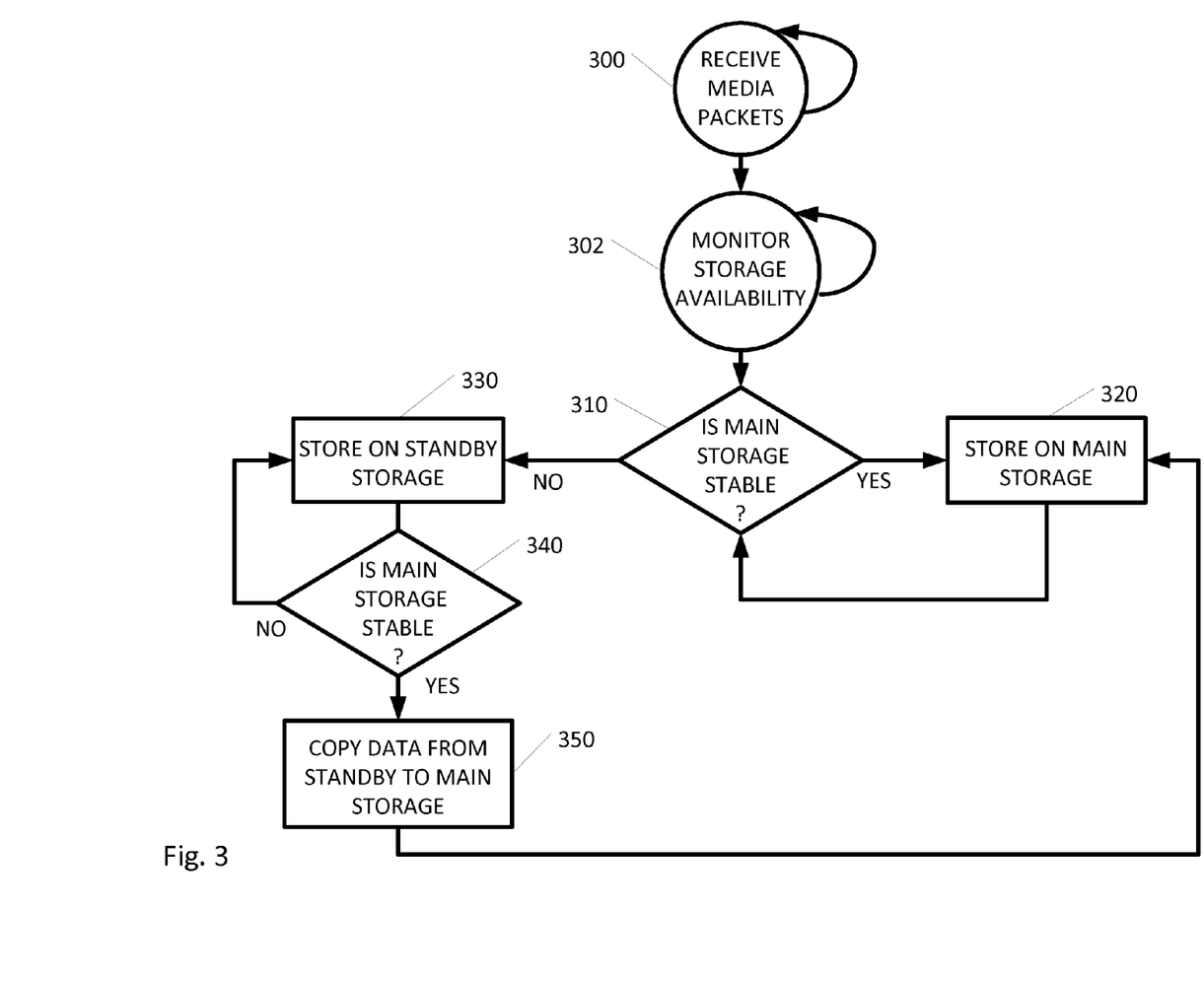
FIG. 3 is a flowchart diagram of a method for managing video storage according to some embodiments of the present invention.

Reference is made to FIG. 3 which is a flowchart diagram of a method for managing video storage according to some embodiments of the present invention. The embodiments described herein with reference to FIG. 3 may be executed by a processor or a controller, for example, by processor 142 of recording server 140. Processor 142 may execute instructions stored in memory 144 to perform the methods disclosed herein. Other systems may perform embodiments of the invention as well.

In operation 300, the method includes receiving a plurality of incoming digital streams of data at a recording server such as recording server 140, for example, from cameras such as cameras 110, the plurality of incoming streams of data may include one or more video streams. The incoming streams of data are received continuously and in real time. Operation 300 continues uninterrupted while the other operations are taking place.

In operation 302, the method includes continuously or intermittently monitoring availability of a main storage device on which the incoming streams of data should be stored, such as main storage device 152. Monitoring of the main storage device may be performed using any applicable method that may give real time indication of the availability of the main storage device. Monitoring of the main storage device may include performing network tests such as disclosed herein. Additionally or alternatively, monitoring of the main storage device may include performing read and write operations and monitoring the response of the main storage device. The read and write operations may include the ordinary writing of the real time streams of data into the main storage device. Additionally or alternatively, the read and write operations may include test read and write operations into various locations of the main storage device. The recording server may request the main storage device to provide acknowledgment for every write operation or the main storage device may be configured to provide an acknowledgment to the recording server for every write operation. The response time of the main storage device to the read and write operations may be measured and it may be determined that the main storage device is unavailable if acknowledgments from the main storage device are not received at all or if the response time is above a predetermined threshold e.g., if acknowledgements are received after a predetermined time period. Operation 302 continues while the other operations are taking place.

If, based on operation 302, it is determined in operation 310 that the main storage device is available, the streams of data are written to the main storage device in operation 320. Thus, the streams of data are stored on the main storage device. However, if it is determined in operation 310 that the main storage device is unavailable, the streams of data are written to the standby storage device in operation 330. Thus, the streams of data that are received while the main storage device is unavailable are not lost and are stored on standby storage device.

If, based on operation 302, it is determined in operation 340 that the main storage device is unavailable, the streams of data continue to be written to the standby storage device in operation 330. However, if the main storage device resumes operation and it is determined in operation 340 that the main storage device is available, the method switches to back to writing additional data of the stream to the main storage device in operation 320. In operation 350, the method includes writing to the main storage device the additional data that was written to the standby storage device while the main storage device was unavailable, concurrently with the writing of the additional real time data of the stream to the main storage device. Thus, operation 350 may be performed concurrently with operation 320 until all the buffered data is transferred to the main storage device.

Operations 320 and 330 may include maintaining records of the location of files in the storage devices in the forms of databases and lists. For example, operations 320 and 330 may update a database that may relate file identification numbers (ID) to the source of the data, the time of recording and the location of the file. Additionally or alternatively, operations 320 and 330 may update a linked list that may include order of files containing consecutive data of a stream, indication for each file on whether it is stored on the main storage device or on the standby storage device. Operations 320 and 330 may update a second list that may include files that were written to the standby storage device while the main storage device was unavailable. The second list may include identification numbers of files stored on the standby storage device and their location on the standby storage device. Operation 350 may include scanning the linked list, the database and the second list, identifying and locating files currently stored on the standby storage device based and transferring those files to the main storage device. Operation 350 may include updating the main database and the lists.

Since writing of the buffered data to the main storage device is performed concurrently with the writing of the additional real time data of the stream to the main storage device, this process should be executed with due care. According to embodiments of the present invention, operation 350 may include monitoring of available throughput of the main storage device and writing to the main storage device the buffered data considering available throughput of the main storage device. The concurrent writing may be manually or automatically controlled to not exceed a predetermined maximal load to the main storage device. As used herein, load may refer to the total throughput to the main storage device. During the concurrent writing, the load may include throughput from both the writing of real time data in operation 320 and the writing of buffered data in operation 350. Priority may be given to writing of real time data in operation 320, and thus writing of the buffered data to the main storage device in operation 350 may be performed when the throughput of writing of real time data in operation 320 is sufficiently below predetermined maximal load. The maximal load may be determined considering the storage type and configuration, and the specific application.

Figure 4:
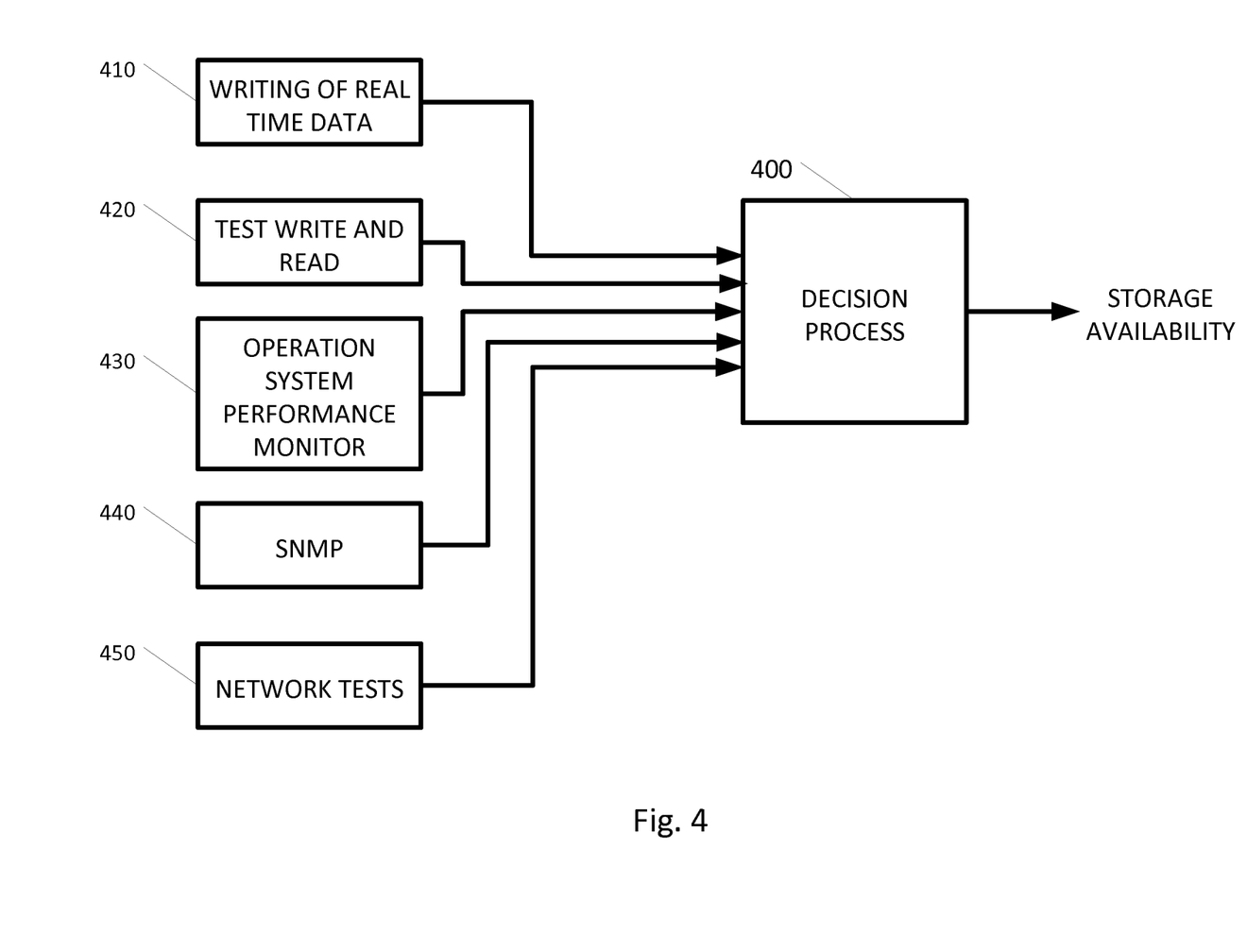
FIG. 4 is a flowchart diagram of a method for monitoring the availability of the main storage device according to some embodiments of the present invention.

Reference is made to FIG. 4 which is a flowchart diagram of a method for monitoring the availability of the main storage device according to some embodiments of the invention. The method described herein with reference to FIG. 4 may be an elaboration of operations 302, 310 and 320 presented in FIG. 3. In operation 400, it is determined whether the main storage device is available or unavailable based on inputs from some or all of operations 410, 420, 430, 440 and 450.

Operation 410 may include writing of the real time streams of data into the main storage device and monitoring the response of the main storage device. The recording server may request the main storage device to provide acknowledgment for every write operation or the main storage device may be configured to provide an acknowledgment to the recording server for every write operation. The response time of the main storage device to the write operations may be measured. Not receiving acknowledgments from the main storage device during a predetermined time interval may serve as an indication that the main storage is unavailable, e.g., an indication of failure may be generated if an acknowledgment from the main storage device is not received at all, or if the acknowledgment is received after the predetermined time interval.

Operation 420 may include performing test read and write operations into various locations of the main storage device and monitoring the response of the main storage device. Response of the main storage device to test write operation may include sending by the main storage device an acknowledgment for every write operation, and response to test read operation may include the read data. Again, not receiving a response from the main storage device during a predetermined time interval may serve as an indication that the main storage is unavailable.

Operation 430 may include using a performance monitor of the operation system (OS) of the recording server. Erratic performance (variance) or sudden performance drop will reduce storage dependability and may serve as an indication that the main storage is unavailable. Storage dependability may be logged and an indication of storage availability may be given if storage dependability passes a predetermined threshold.

In operation 440 network tests that are routinely performed as part of Simple Network Management Protocol (SNMP) are used as indication of the availability of the main storage device. In operation 450 other network tests such as ping, etc., are used to get indication of the availability of the main storage device.

Operation 400 may include determining according to a decision algorithm and based on inputs from some or all of operations 410, 420, 430, 440 and 450 whether the main storage device is available or unavailable. According to embodiments of the present invention, it may be determined whether the main storage device is available or unavailable based on at least one of: the type of failure of the main storage device, the amount of failures of the main storage device that occurred in a time interval and on the average duration of each failure of the main storage device. For example, it may be determined that the main storage device is not available if an indication for a failure is received from any of operations 410, 420, 430, 440 and 450. Alternatively, unavailability may be determined only if several indications of unavailability are obtained from operations 410, 420, 430, 440 and 450, during a predetermined time period. According to some embodiments, different weights may be given to indications received from operations 410, 420, 430, 440 and 450. For example, indication of failure of a real time write operation received from operation 410 may be considered as more significant and may be given higher weight in comparison to an indication of a failure in a ping operation obtained from operation 450.

Operation 400 may employ an adaptive algorithm according to which if the main storage device resumes operation after being unavailable, operation 400 may not determine that the main storage device is available to the recording server instantly, but will require the main storage device to be stable and operative for a test period of time. The duration of the test period may be fixed and predetermined, or it may vary according to criteria such as frequency of failures of the main storage device, the duration of each failure, the type of failure, the average response time of the main storage device, etc.

An example of statistics of five different main storage devices such as main storage devices 152 is given in table 1. Failures per minute statistics may include an average amount of failures per minute over a predetermined time window and failures per day statistics may include an average amount of failures per day over a predetermined time window. According to embodiments of the present invention, the frequency of the failures may indicate different problems. For example, large amount of failures per minute may indicate a local problem, where large amount of failures per day may indicate a site wide problem. Main storage device #0 has experienced zero failures, is considered very reliable and its test period is practically null. Thus, in case main storage device #0 becomes unavailable, main storage device #0 may be available to the recording server once it resumes operation, without waiting before making it available to the recording server. Main storage devices #1 and #4 have experienced some failures, however main storage devices #1 and #4 are still considered reliable and their test period is practically null. Main storage devices #2 and #3 have experienced a considerable amount of failures, and therefore are considered unreliable. Thus, in case main storage device #2 or #3 becomes unavailable, it may be available to the recording server only after it resumes operation and remains available for the duration of the test period which is 4 hours for device #2 and 5 hours for device #3.

TABLE 1 statistics of five different main storage devices

| Storage # | Failures per minute | Failures per day | Average time for failure [min] | Conclusion | Test period [Hr] |
|---|---|---|---|---|---|
| 0 | 0 | 0 | 0 | reliable | 0 |
| 1 | 1 | 5 | 6 | reliable | 0 |
| 2 | 10 | 1000 | 0.1 | unreliable | 2 |
| 3 | 12 | 1000 | 0.1 | unreliable | 5 |
| 4 | 1 | 1 | 100 | reliable | 0 |

Figure 5:
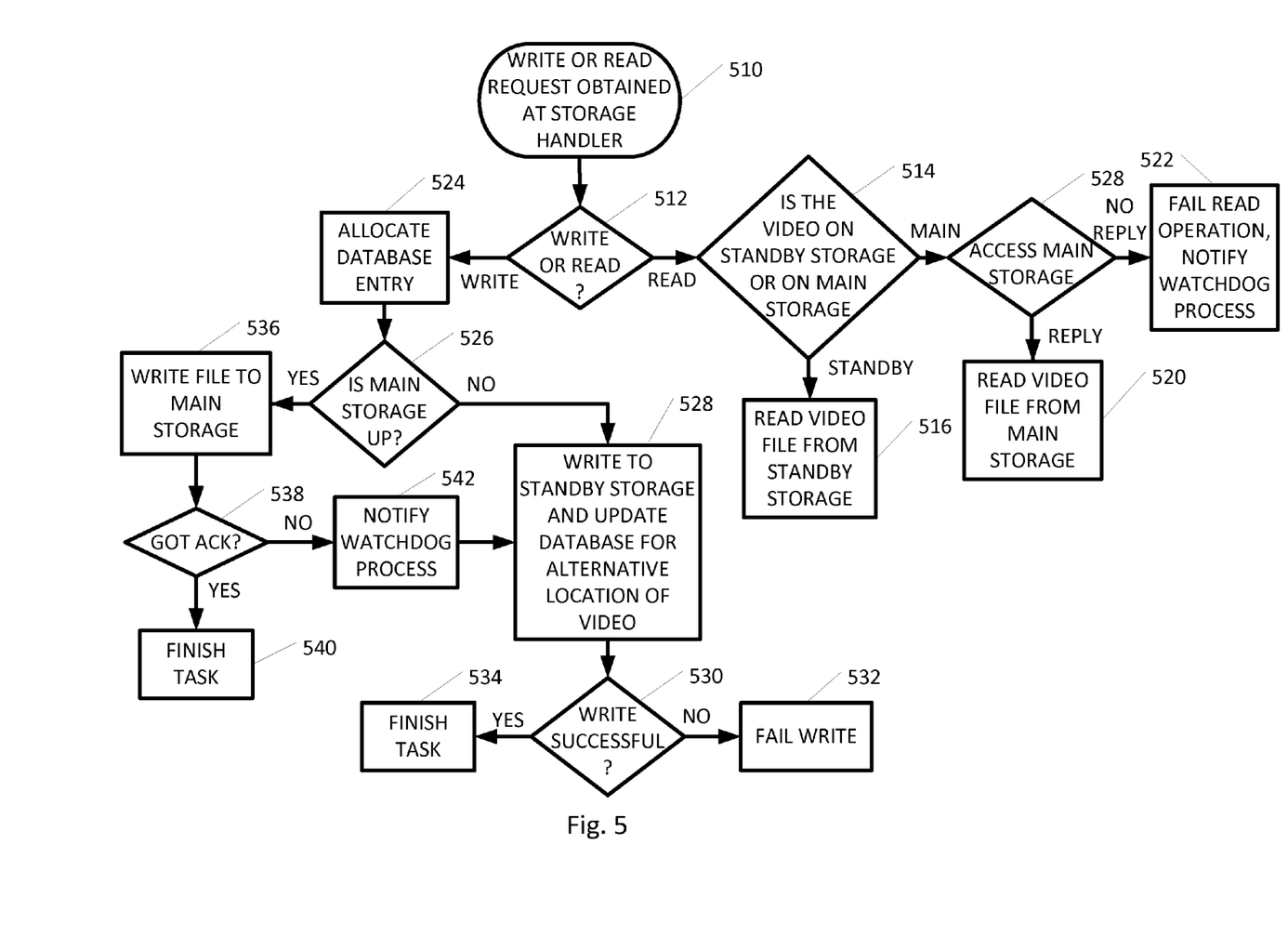
FIG. 5 is a flowchart diagram of a method for performing read and write operations according to some embodiments of the invention.

Reference is made to FIG. 5, which is a flowchart diagram of a method for performing read and write operations according to some embodiments of the present invention. The method described herein with reference to FIG. 5 may be executed by a processor or a controller, for example, by processor 142 of recording server 140, for example, by storage handler block 234.

In operation 510 a read or write request may be obtained. In operation 512 it may be determined whether the requested operation is a read request or a write request. If a read is requested, the method moves to operation 514 in which it may be determined, for example, based on information stored in a database or a list, whether the file is stored on the main storage device or on the standby storage device. If the file is stored on the standby storage device, in operation 516 the file may be read from the standby storage device. If the file is stored on the main storage device, the main storage device may be accessed in operation 528. If the main storage device responses, in operation 520 the file is read from the main storage device. If no reply is obtained from the main storage device, it may be determined in operation 522 that the read operation has failed. A notification of the failure may be sent to the Storage watchdog block 232 and may serve as an indication suggesting that the main storage device is unavailable.

If a write is requested, the method may move to operation 524 in which a database entry may be allocated for the file that needs to be written to the main storage device. The database may include, for example, information regarding the location of the files in the storage devices. Operation 524 may include allocating a location for the file in the main storage device and updating the database entry with the location of the file. In operation 526 it may be checked whether the main storage device is available. For example, storage watchdog process 232 may be interrogated regarding the status of the main storage device. If the main storage device is unavailable, the method may move to operation 528 in which the file may be written to the standby storage device and the database may be updated regarding the alternative location of the file. In operation 530, it may be verified whether the write operation has been successful. For example, the standby storage device may provide acknowledgment for every successful write operation. If the acknowledgment is received within a predetermined time window, it may be determined that the write operation has been successful. If the write operation has been successful, the task is completed as indicated in block 534, otherwise the write operation has failed, as indicated in block 532.

If, in operation 526, it is determined that the main storage device is available, the method may move to operation 536 in which the file may be written to the main storage device. In operation 538 it may be verified whether the write operation has been successful. For example, the main storage device may provide acknowledgment for every successful write operation. If the acknowledgment is received within a predetermined time window, it may be determined that the write operation has been successful. If the write operation has been successful, the task is completed as indicated in block 540. Otherwise, in operation 542 the watchdog process may be notified of the failure of the main storage device, and the method may move to operation 528 described hereinabove.

According to embodiments of the present invention, a database may be maintained, for example, on memory 144 by processor 142. The database may be used to relate file identification numbers (ID) to the source of the data, the time of recording of the data and the location of the file on the storage devices. An exemplary database is presented in Table 2. Each entry in the database is represented in a row. Each entry may include a file ID, channel number, the time of start and end of recording, the storage device the file is stored on, along with the location of the file on the respective storage device.

TABLE 2

An exemplary database

| File ID | Channel number | Start Date and time | End Date and time | Start location | | End location | | Main storage device |
| --- | --- | --- | --- | --- | --- | --- | --- | --- |
| | | | | Drive Number | Location on drive (sector) | Drive Number | Location on drive (sector) | |
| 1 | 1 | 9/9/2012 16:22:44 | 9/9/2012 16:25:30 | 0 | 1000 | 0 | 1022 | No |
| 2 | 1 | 9/9/2012 16:25:31 | 9/9/2012 16:28:38 | 1 | 10000 | 1 | 12000 | No |
| 3 | 1 | 9/9/2012 17:22:04 | 9/9/2012 17:24:30 | 15 | 2 | 15 | 102 | Yes |
| . | | | | | | | | |
| . | | | | | | | | |
| . | | | | | | | | |
| N | | | | | | | | |

Figure 6:
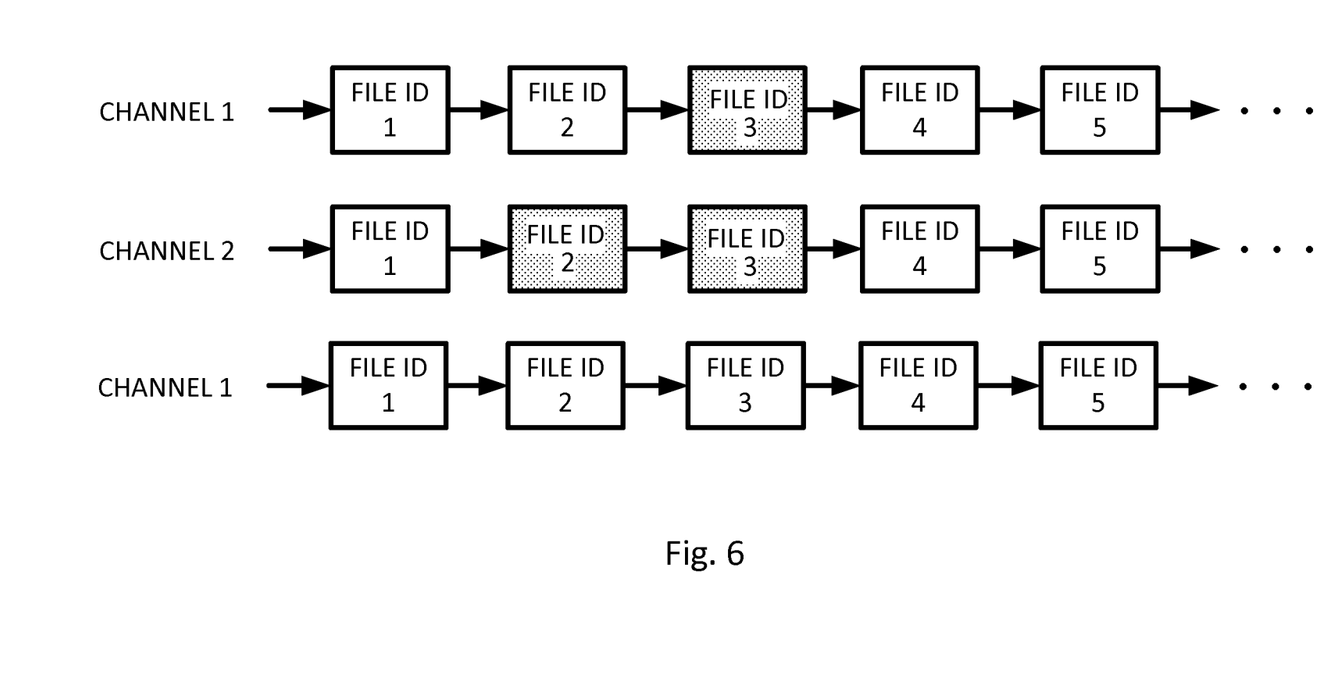
FIG. 6 demonstrates a linked list according to some embodiments of the invention.

In addition to the database, a linked list may be maintained, for example, on memory 144 by processor 142. The linked list may include indication of the order of files containing consecutive data of a channel or a stream, and indication for each file on whether it is stored on the main storage device or on the standby storage device. The linked list may be used to efficiently access the files on both the main storage and the standby storage devices. A linked list is illustrated in FIG. 6. Files are represented by rectangles. Clear rectangles represent files that are stored on the main storage device while dotted rectangles represent files that are stored on the standby storage device. Synchronizing block 236 may scan the linked lists to find which files are stored on the standby storage device, read the files from the standby storage device and write those files to the main storage device. The database may be updated with the new locations of the transferred files on the main storage device.

According to some embodiments, a list of file IDs located on the standby storage device and their location on the standby storage device may be maintained, for example, on memory 144 by processor 142. This list may be updated each time a file is written to or read from the standby storage device. This list may be used when moving the files back to the main storage device. Table 3 includes an exemplary structure of the list.

TABLE 3

An exemplary structure of the list

| File ID | Channel number | Start location (sector) | End location (Sector) |
| --- | --- | --- | --- |
| 1 | 1 | 1000 | 1022 |
| 2 | 1 | 1023 | 1200 |
| 3 | 1 | 1201 | 1250 |
| . | | | |
| . | | | |
| . | | | |
| N | | | |

Some embodiments of the present invention may be implemented in software for execution by a processor-based system, for example, recording server 140. For example, embodiments of the present invention may be implemented in code or software and may be stored on a non-transitory storage medium having stored thereon instructions which, when executed by a processor, cause the processor to perform methods as discussed herein, and can be used to program a system to perform the instructions. The non-transitory storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices. Other implementations of embodiments of the present invention may comprise dedicated, custom, custom made or off the shelf hardware, firmware or a combination thereof.

Embodiments of the present invention may be realized by a system that may include components such as, but not limited to, a plurality of central processing units (CPU) or any other suitable multi-purpose or specific processors or controllers, a plurality of input units, a plurality of output units, a plurality of memory units, and a plurality of storage units. Such system may additionally include other suitable hardware components and/or software components.

While certain features of the invention have been illustrated and described herein, many modifications, substitutions, changes, and equivalents may occur to those skilled in the art. It is, therefore, to be understood that the appended claims are intended to cover all such modifications and changes that fall within the true spirit of the invention.

What is claimed is:

1. A method for managing storage of a digital stream, the method comprising:
    writing data of the stream to a main storage device, while monitoring availability of the main storage device;
    switching to writing additional data of the stream to a standby storage device while continuing monitoring the availability of the main storage device, if the main storage device becomes unavailable;
    switching back to writing additional data of the stream to the main storage device while continuing monitoring the availability of the main storage device, when the main storage device becomes available; and
    writing to the main storage device the additional data that was written to the standby storage device while the main storage device was unavailable, concurrently with the writing of the additional data of the stream to the main storage device,
    wherein monitoring availability of the main storage device comprises:
        performing test read and write operations into various locations on the main storage device;

measuring response time of the test operations; and
determining that the main storage device is unavailable if the response time is above a predetermined threshold.

2. The method of claim 1, wherein the main storage device is a network storage device and the standby storage device is a direct access storage device.

3. The method of claim 2, wherein monitoring availability of the network storage device comprises performing network tests.

4. The method of claim 1, comprising:
determining whether the main storage device is available or unavailable based on at least one of: a type of failure of the main storage device, amount of failures of the main storage device that occurred in a time interval and on an average duration of each failure of the main storage device.

5. The method of claim 1, comprising:
monitoring of available throughput of the main storage device,
wherein the writing to the main storage device the additional data that was written to the standby storage device is performed considering available throughput of the main storage device.

6. The method of claim 1, wherein the data is saved in files, and the method comprises:
maintaining a list of the files, wherein the list comprises for each file an indication of whether it is stored on the main storage device or on the standby storage device and location of each file on either the main storage device or the standby storage device.

7. A method for managing storage of a digital stream, the method comprising:
writing data of the stream to a main storage device, while monitoring availability of the main storage device;
switching to writing additional data of the stream to a standby storage device while continuing monitoring the availability of the main storage device, if the main storage device becomes unavailable;
switching back to writing additional data of the stream to the main storage device while continuing monitoring the availability of the main storage device, when the main storage device becomes available; and
writing to the main storage device the additional data that was written to the standby storage device while the main storage device was unavailable, concurrently with the writing of the additional data of the stream to the main storage device,
wherein the data is saved in files, and the method comprises:
maintaining a list of the files, wherein the list comprises for each file an indication of whether it is stored on the main storage device or on the standby storage device and location of each file on either the main storage device or the standby storage device; and
maintaining a linked list, wherein the linked list comprises order of files containing consecutive data of a stream, and indication for each file on whether it is stored on the main storage device or on the standby storage device,
wherein the writing to the main storage device the additional data that was written to the standby storage device comprises:
scanning the linked list;
writing files that are stored in the standby storage device to the main storage device; and
updating the linked list.

8. A recording server for managing storage of a digital stream, the recording server comprising:
a processor configured to:
write data of the stream to a main storage device, while monitoring availability of the main storage device;
switch to writing additional data of the stream to a standby storage device while continuing monitoring the availability of the main storage device, if the main storage device becomes unavailable;
switch back to writing additional data of the stream to the main storage device while continuing monitoring the availability of the main storage device, when the main storage device becomes available; and
write to the main storage device the additional data that was written to the standby storage device while the main storage device was unavailable, concurrently with the writing of the additional data of the stream to the main storage device,
wherein the processor is configured to monitor availability of the network storage device by:
performing test read and write operations into various locations on the main storage device;
measuring response time of the test operations; and
determining that the main storage device is unavailable if the response time is above a predetermined threshold.

9. The recording server of claim 8, wherein the main storage device is a network storage device and the standby storage device is a direct access storage device.

10. The recording server of claim 9, wherein the processor is configured to monitor availability of the network storage device by performing network tests.

11. The recording server of claim 8, wherein the processor is configured to:
determine whether the main storage device is available or unavailable based on at least one of: a type of failure of the main storage device, amount of failures of the main storage device that occurred in a time interval and on an average duration of each failure of the main storage device.

12. The recording server of claim 8, wherein the processor is configured to:
monitor available throughput of the main storage device; and
write to the main storage device the additional data that was written to the standby storage device considering available throughput of the main storage device.

13. A non-transitory computer-readable storage medium, having stored thereon instructions, that when executed on a processor, cause the processor to:
write data of the stream to a main storage device, while monitoring availability of the main storage device;
switch to writing additional data of the stream to a standby storage device while continuing monitoring the availability of the main storage device, if the main storage device becomes unavailable;
switch back to writing additional data of the stream to the main storage device while continuing monitoring the availability of the main storage device, when the main storage device becomes available; and
write to the main storage device the additional data that was written to the standby storage device while the main storage device was unavailable, concurrently with the writing of the additional data of the stream to the main storage device,
wherein the instructions when executed cause the processor to monitor availability of the network storage device by:
performing test read and write operations into various locations on the main storage device;
measuring response time of the test operations; and determining that the main storage device is unavailable if the response time is above a predetermined threshold.

14. The non-transitory computer-readable storage medium of claim 13, wherein the main storage device is a network storage device and the standby storage device is a direct access storage device.

15. The non-transitory computer-readable storage medium of claim 13, wherein the instructions when executed cause the processor to monitor availability of the network storage device by performing network tests.

16. The non-transitory computer-readable storage medium of claim 13, wherein the instructions when executed cause the processor to:
   determine whether the main storage device is available or unavailable based on at least one of: a type of failure of the main storage device, amount of failures of the main storage device that occurred in a time interval and on an average duration of each failure of the main storage device.

17. The non-transitory computer-readable storage medium of claim 13, wherein the instructions when executed cause the processor to:
   monitor available throughput of the main storage device; and
   write to the main storage device the additional data that was written to the standby storage device considering available throughput of the main storage device.

* * * * *